(No Model.) 2 Sheets—Sheet 1.
G. FOCHT, Jr.
BICYCLE WHEEL.
No. 516,482. Patented Mar. 13, 1894.
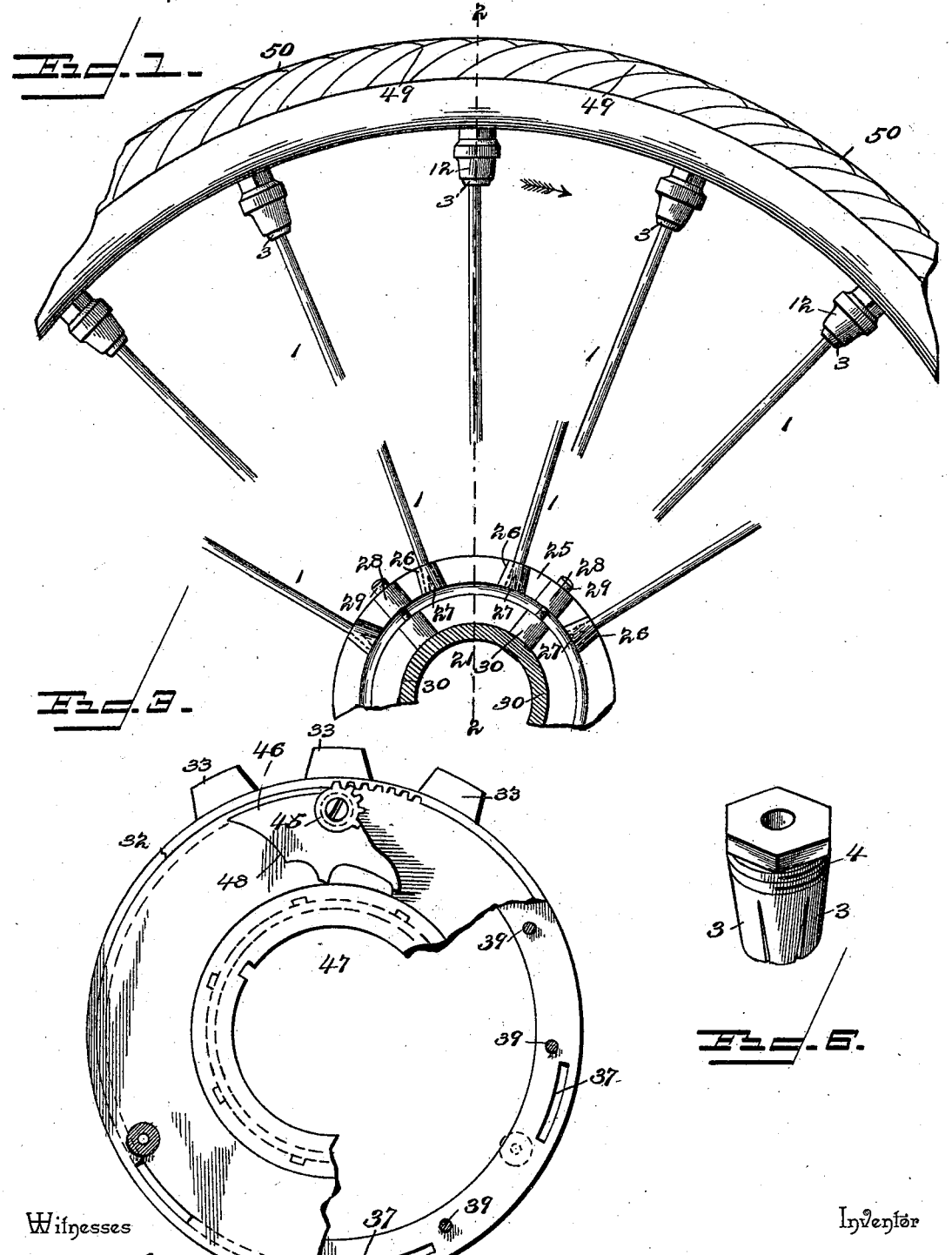

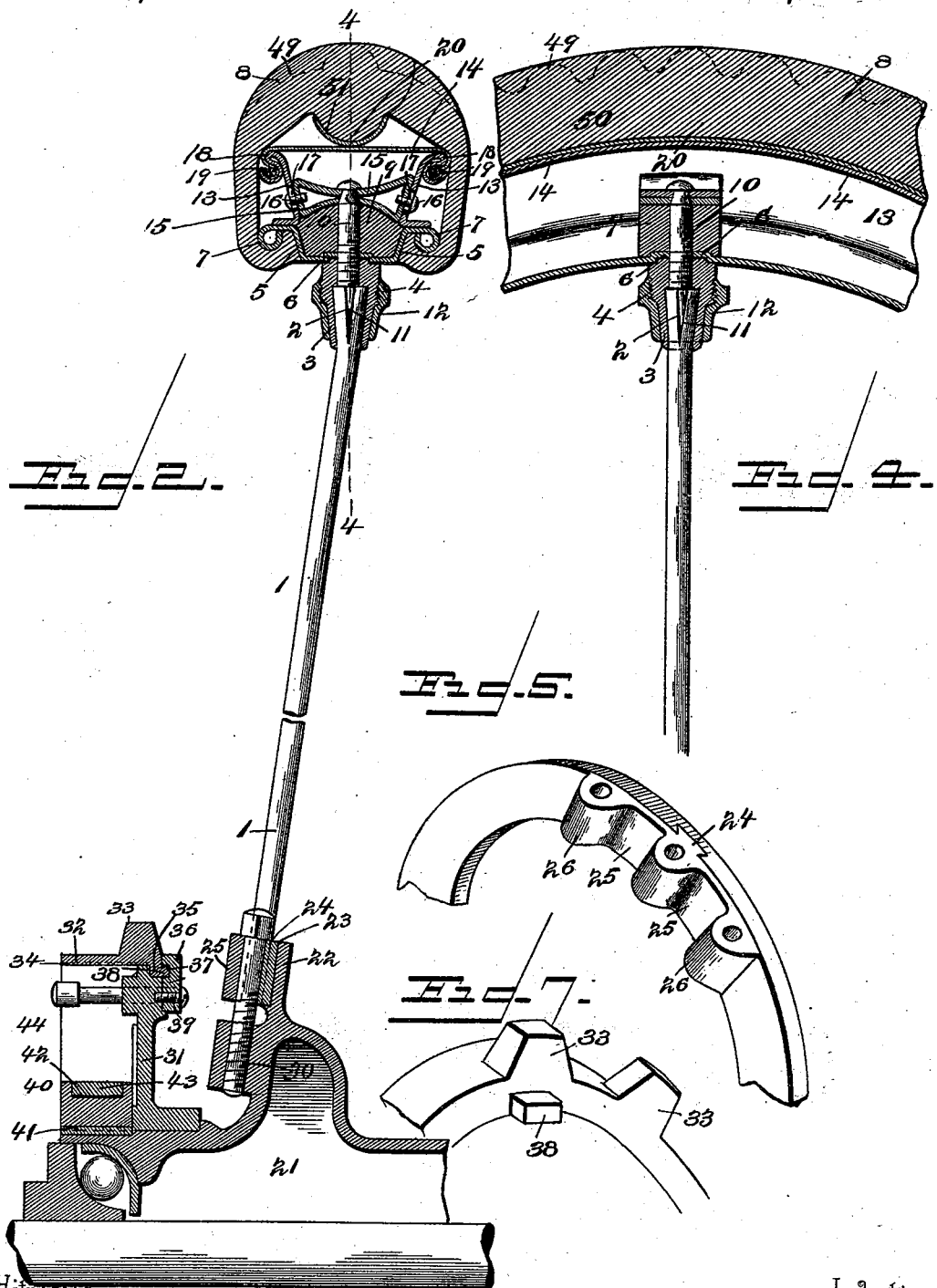

UNITED STATES PATENT OFFICE.

GEORGE FOCHT, JR., OF HOBOKEN, NEW JERSEY.

BICYCLE-WHEEL.

SPECIFICATION forming part of Letters Patent No. 516,482, dated March 13, 1894.

Application filed April 7, 1893. Serial No. 469,382. (No model.)

*To all whom it may concern:*

Be it known that I, GEORGE FOCHT, Jr., a citizen of the United States, residing at Hoboken, in the county of Hudson and State of New Jersey, have invented a new and useful Bicycle-Wheel, of which the following is a specification.

My invention relates to improvements in wheels, and has special reference to wheels of bicycles and similar vehicles, the objects of my invention being to provide improved means for adjusting the spokes; to provide a combined clutch and brake-mechanism to be operated by the pedals of the vehicle; to provide a wheel in which lightness and strength are combined; to provide improved means for setting the outer ends of the spokes in the felly; and to provide a tire capable of yielding to pressure and provided with means to prevent slipping.

Further objects and advantages of my invention will appear in the following description, and the novel features thereof will be particularly pointed out in the appended claims.

In the drawings—Figure 1 is a side view of a wheel embodying my invention. Fig. 2 is a transverse sectional view of the same upon line 2—2 of Fig. 1. Fig. 3 is a side view, partly broken away, of the hub. Fig. 4 is a vertical section on line 4—4 of Fig. 2. Fig. 5 is a detail view of one of the adjustable plates by which the inner ends of the spokes are connected to the hub. Fig. 6 is a detail view of one of the split thimbles by which the outer ends of the spokes are inclosed. Fig. 7 is a similar view of a portion of the rotatable sprocket-ring to show the studs upon the inner edge thereof.

Similar numerals of reference indicate corresponding parts in the several figures of the drawings.

1 designates the spokes which are provided at their inner and outer ends with longitudinal cuts or kerfs 2, whereby said ends may be spread or expanded. Upon the outer ends of the spokes are fitted split thimbles 3, which are conical in section and are provided at an intermediate point with an exterior screw-thread 4.

5 represents a concave rim, preferably formed of sheet metal and provided in its inner surface with a series of depressions 6 to receive the outer ends of the thimbles 3. The lateral edges of the rim are bent upon themselves to form beads 7, around and under which the inner edges of the rubber tire 8 are passed. Within the concave portion of the rim is fitted a cushion 9, preferably of rubber or similar material, and through the said cushion and the floor of the rim is extended a threaded pin 10, whose inner end is provided with a spreading pin 11 to extend into the split end of the spoke and thereby spread the latter to fit snugly in the bore of the thimble 3. The outer portion of the bore of the thimble 3 is threaded to engage the shank of the pin 10, said outer portion of the thimble being provided with an angular exterior surface. A cap 12, also of conical shape, is threaded upon the outer surface of the thimble to contract the jaws of the latter and firmly clamp the end of the spoke therein.

13 represents a pair of expanding-rings slidably mounted upon the rim and connected at their outer free edges by a flexible web 14, which is preferably made of canvas. Arranged adjustably between the twin expanding-rings are the expanders 15 provided with divergent sides engaged by set screws 16 which extend through slots 17 in the expanding-rings. By means of these expanders the interval between the expanding-rings may be adjusted at will by the manipulation of the thimble 3. The outer ends of the threaded pins 10 are headed in these expanders, thus locking all of the above described parts of the felly together. The upper and lower sides of the expander are arched whereby they are in contact at their centers at the point which is pierced by the pins 10. The web 14 is continuous, extending entirely around the wheel and its side edges are carried around the outer edges of the expanding-rings and extend into grooves 18 where they are locked in place by means of cords or tapes 19. The grooves 18 are formed by the bending of the outer edges of the expanding-rings. The tire 8, as above described, is extended at its inner edges under the lateral edges of the rim 5 and it is provided at its center with an inward extending rib 20, which is rounded in section and bears at its center upon the center of the flexible web 14.

The hub is provided with a shell 21, having duplicate peripheral flanges 22, in whose outer surfaces are formed dovetailed recesses 23. In these recesses are fitted dovetailed webs 24 upon the inner surfaces of the adjusting plates 25. These adjusting plates are provided at their extremities with sockets 26 in which are fitted the inner ends of the spokes 1, said spokes being locked in the sockets by means of wedges 27. The adjusting plates 25 are provided at their centers with sleeves 28 through which pass adjusting-screws 29, whose inner threaded ends are fitted into threaded bores of the fixed bosses 30, which are formed upon the outer surfaces of the flanges 22. By means of these adjusting-screws the adjusting plates may be moved toward or from the center of the wheel to increase or diminish the tension of the spokes.

Rotatably fitted upon the shell of the hub is a web 31 and upon the outer periphery of the latter is fitted a loose sprocket rim 32 provided with sprocket teeth 33 and a laterally-extending interiorly-toothed flange 34. Secured to the inner surface of the web adjacent to its periphery and overlapping the inwardly-extending edge 35 of the rim 32 is a stop-ring 36, in whose outer surface is formed a series of stop-grooves 37 in which fit and operate projections 38 carried by the rim 32. The stop-ring 36 is secured to the web 31 by means of screws 39.

40 represents a friction-ring which surrounds the outer portion of the shell of the hub adjacent to the outer surfaces of the web 31 and is securely locked to the said shell by means of a threaded pin 41. The outer surface of this friction-ring is grooved, as shown at 42, and in the groove is fitted an annular friction-block 43, which is preferably of wood or other similar material.

Pivotally connected to the outer surface of the web 31 are the clutches 44 which are provided, concentric with their pivotal points, with segments 45 to engage the teeth upon the inner surface of the flange 34. The duplicate arms 46, of the clutches, are provided, respectively, with a friction surface 47 and a brake-shoe 48. Said friction surface 47 preferably consists of a rubber face adapted to engage the outer surface of the friction-block 43, and the brake-shoe 48 preferably consists of a concaved surface designed, when brought in contact with said friction-block, to impede the rotation of the web upon the shell of the hub.

The outer surface of the tire is provided with V-shaped ribs 49 which are intersected at their centers by a peripheral connecting rib 50, said ribs being designed to prevent the sliding of the tire upon the smooth surfaces of pavements, &c., when the latter are wet.

In operation the interior rounded rib 20, upon the tire, bears against the center of the bridging-web 14, which latter is capable of yielding slightly to relieve jars. Chafing between the surfaces of the rib and the said web is prevented by providing the surface of the former with a shield 51, of canvas or similar material. The set screws 16 are intended to prevent the expanding-rings from springing out of place in case the bridging-web becomes damaged; the expanders being manipulated to spread the expanding-rings by means of the thimbles 3. The cushion 9, which is arranged in the concave rim 5 and is held in place by the expanders which bear upon the outer surface of the cushion, provides for the yielding of the frame of the felly to prevent severe strains from disarranging the parts thereof. By means of the adjusting screw 29, which is provided with an angular head, as shown clearly in the drawings, the tension of the individual spokes may be adjusted at will, the direction of draft of said adjusting screw and the direction of movement of the adjusting plates being in alignment with the spokes whose inner ends are connected thereto. When the chain, which is engaged with the sprocket rim, is turned in the direction indicated by the dart in Fig. 1, or forwardly, the frictional surface of the clutch is brought in contact with the surface of the friction-block thereby turning the shell in the same direction and causing the forward rotation of the wheel. As long as said forward movement of the chain is continued the contact between the said frictional surfaces will be maintained, but when the forward pressure upon the pedals of the machine is relieved the said frictional contact will be correspondingly relieved and the wheel will be allowed to rotate independent of the pedals, thus enabling the rider to "coast" upon down grades without removing his feet from the pedals. When the rider desires to check the movement of the machine it is simply necessary to "back" the pedals, thereby bringing the brake-shoe carried by the clutch in contact with the surface or the friction-block.

The interlocking projections 38 and stop-grooves 37, carried respectively by the sprocket rim and stop-ring, enable the said rim to rotate a limited distance independently of the web 31 to enable the clutches to be reversed to bring either the brake-shoe or the friction-surface into contact with the friction-block, before said projections strike the terminals of the stop-grooves.

The spokes of my improved wheel are preferably made of rattan which, by the means provided, can be secured firmly to the rim and hub to provide the necessary strength and durability.

Changes in the form, proportion, and minor details of construction may be resorted to without departing from the spirit or sacrificing any of the advantages of my invention.

Having described my invention, what I claim, and desire to secure by Letters Patent, is—

1. In a wheel, the combination with the rim provided with laterally-adjustable expanding-rings and a flexible bridging-web connecting said expanding-rings, of a tire provided with an interior rib which bears upon said bridging-web at a point intermediate between its supports, substantially as specified.

2. In a wheel, the combination with the rim of a flexible web, expanding-devices connected to the lateral edges of said web, and a tire provided with an interior rib to engage said web at a point intermediate between its supports, substantially as specified.

3. In a wheel, the combination with a rim of laterally-adjustable expanding-rings, an interposed expander, means for adjusting said expander to vary the interval between the expanding-rings, and a tire inclosing said rings, substantially as specified.

4. In a wheel, the combination with a rim of outwardly-divergent expanding-rings slidably mounted upon said rim, an expander interposed between said expanding-rings and having divergent sides to bear against the inner surfaces thereof, adjusting connections between said expander and expanding-rings whereby the interval between the latter may be varied, and a tire inclosing said expanding-rings, substantially as specified.

5. In a wheel, the combination with a rim, of outwardly-diverging expanding-rings slidably mounted upon said rim and connected at their outer edges by a non-elastic, flexible bridging-web, an expander interposed between said rings, adjusting connections between said expander and expanding-rings, and a tire inclosing said rings, substantially as specified.

6. The combination with a hollow rim, laterally-adjustable expanding-rings slidably mounted upon said rim and connected at their outer edges by a bridging-web, an expander interposed between said expanding-rings and provided with adjusting-devices, and a tire provided with an interior rib to engage said bridging-web, of a cushion disposed in the hollow tire with its outer surface in contact with said expander, substantially as specified.

7. The combination with a rim, of split spokes, two conical thimbles embracing the outer extremities of said spokes, and threaded expanding-pins fixed at their outer ends to the rim and fitting in threaded bores in the said thimbles, said expanding-pins being provided at their inner ends with tapered expanding-points to engage the split extremities of the spokes, substantially as specified.

8. The combination with a rim, of spokes provided with outer split terminals, threaded expanding-pins carried by said rim and provided at their inner ends with expanding-points to engage the split extremities of the spokes, split conical thimbles embracing the terminals of the spokes and threaded upon said expanding-pins, and contracting caps threaded upon the exterior surfaces of the thimbles, substantially as specified.

9. The combination of a hollow rim provided with lateral beaded edges, expanding-devices carried by said rim, a transverse bridging-web connected to said expanding-devices, and a tire provided with an interior rib bearing upon the center of said bridging-web and having its lateral edges extended under said lateral beaded edges of the rim, substantially as specified.

10. The combination with a rim, of a tire having its outer surfaces provided with V-shaped ribs and a connecting central rib, substantially as specified.

11. The combination with a rim and spokes of a hub provided with peripheral flanges, adjusting plates slidably mounted upon said flanges and provided with sockets to receive the inner ends of the spokes, and adjusting-devices connected to said plates, substantially as specified.

12. The combination with a rim and spokes, of a hub provided with peripheral flanges arranged respectively in planes parallel with the spokes, adjustable plates slidably mounted upon said flanges and provided with terminal spoke-sockets, and adjusting-screws rotatably mounted upon said plates and engaging tapped bosses upon the flanges, substantially as specified.

13. The combination with a rim, spokes, and a shell to which the inner ends of said spokes are connected, of a web rotatably mounted upon said shell, a loose sprocket-rim carried by said web, and clutch devices connecting said sprocket-rim and web, substantially as specified.

In testimony that I claim the foregoing as my own I have hereto affixed my signature in the presence of two witnesses.

GEO. FOCHT, JR.

Witnesses:
MAX SCHALSCHA,
CHAS. H. FOCHT.